March 25, 1969 H. KUHN 3,435,444

WIRELESS ALARM TRANSMISSION INSTALLATION

Filed Sept. 24, 1965 Sheet 1 of 2

INVENTOR:
HANS KUHN
By Werner W. Kleeman
His Attorney

INVENTOR:
HANS KUHN
By Werner W. Kleeman
His Attorney

United States Patent Office 3,435,444

Patented Mar. 25, 1969

3,435,444

WIRELESS ALARM TRANSMISSION INSTALLATION

Hans Kuhn, Zollikofen, Bern, Switzerland, assignor to Securiton A.G., Zollikofen, Bern, Switzerland, a corporation of Switzerland Filed Sept. 24, 1965, Ser. No. 489,846

Claims priority, application Switzerland, Sept. 28, 1964, 12,572/64

Int. Cl. G08b 29/00, 1/08

U.S. Cl. 340—214 7 Claims

ABSTRACT OF THE DISCLOSURF

Figure 1:
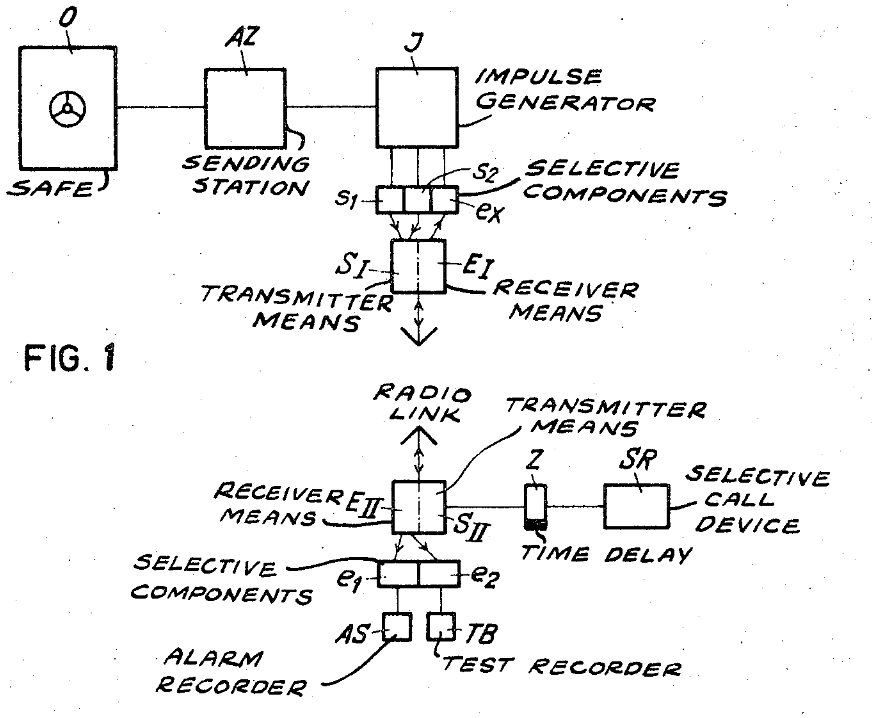

An alarm transmission installation is disclosed for transmitting an alarm from a place which is being protected or supervised to a central command station. The alarm transmission installation has provisions for carrying out a checking operation to determine the preparedness of each protected or supervised place from the central command station. In this regard, the central command station is provided with means for transmitting a selective call to the supervised or subscriber stations, the selective call being received at a selected subscriber station whereby an impulse generator and a selective transmitter located thereat is switched-in and test signals are transmitted from the subscriber station to the central location as a function of the preparedness of the subscriber station.

The present invention has reference to an alarm transmission installation for transmitting an alarm from a place which is being protected or supervised to a central command station wherein each subscriber, typically an establishment, connected to the mentioned installation has associated therewith means for the generation and wireless transmission of an alarm signal, said central command station incorporating means for receiving such alarm signal and means for checking the condition of switching-in of the first-mentioned means for generating and transmitting the alarm signal located at any given place undergoing protective supervision.

Alarm transmission installations not only need to carry out a local, giving or sounding of the alarm, but at the same time also a remote signalling or communication to an authorized central command station, for instance the police or fire station.

Different apparatuses which give the alarm of such alarm transmission installations through the agency of the telephone network or similar lines of communication are already known to the art. However, they are also associated with the disadvantage that although the alarm signal is transmitted, for instance from a bank to the police station, the latter is never certain that the alarm transmitting installation has been properly switched in and is in an operationally ready state. At the same time, the possibility of obtaining lines of communication, e.g. renting telephone lines, continues to decrease noticeably since the telephone networks are overloaded in most places.

Accordingly, it is a primary object of this invention to provide an improved alarm transmission installation which effectively eliminates the aforementioned disadvantages of known devices.

Another object of this invention relates to an improved alarm transmission installation which is highly reliable in operation and can be remotely checked out by the central command station to determine if it is in a state of readiness for transmitting an alarm signal.

Still a further noteworthy object of this invention is concerned with the provision of an improved alarm transmission installation which is relatively simple and economical in construction, highly reliable in operation, provides a high degree of security, and enables a check to be made to determine whether the alarm transmission installation is in condition to transmit its alarm signal.

In order to implement these and still further objects of the invention which will become more readily apparent as the description proceeds, the inventive alarm transmission apparatus is characterized by the features that, the means for checking the condition of switching-in of the alarm system at a given place being protected exhibits a selective calling device coupled to a timing relay which is operatively connected with a transmitter arranged at the central command station and serving to transmit a selective call signal. Additionally, a selective receiver is operably associated with each subscriber, i.e. the place being protected, which receives the aforesaid selective call signal, and wherein an impulse generator is placed into operation by such selective call signal. Furthermore, there is provided a selective transmitter which is switched in by the impulse generator when a selective call signal appears and transmits signals as a function of the condition of switching-in of the alarm system at the place being protected, and a receiver arranged at the central command station receives the aforementioned signals.

Figure 2:
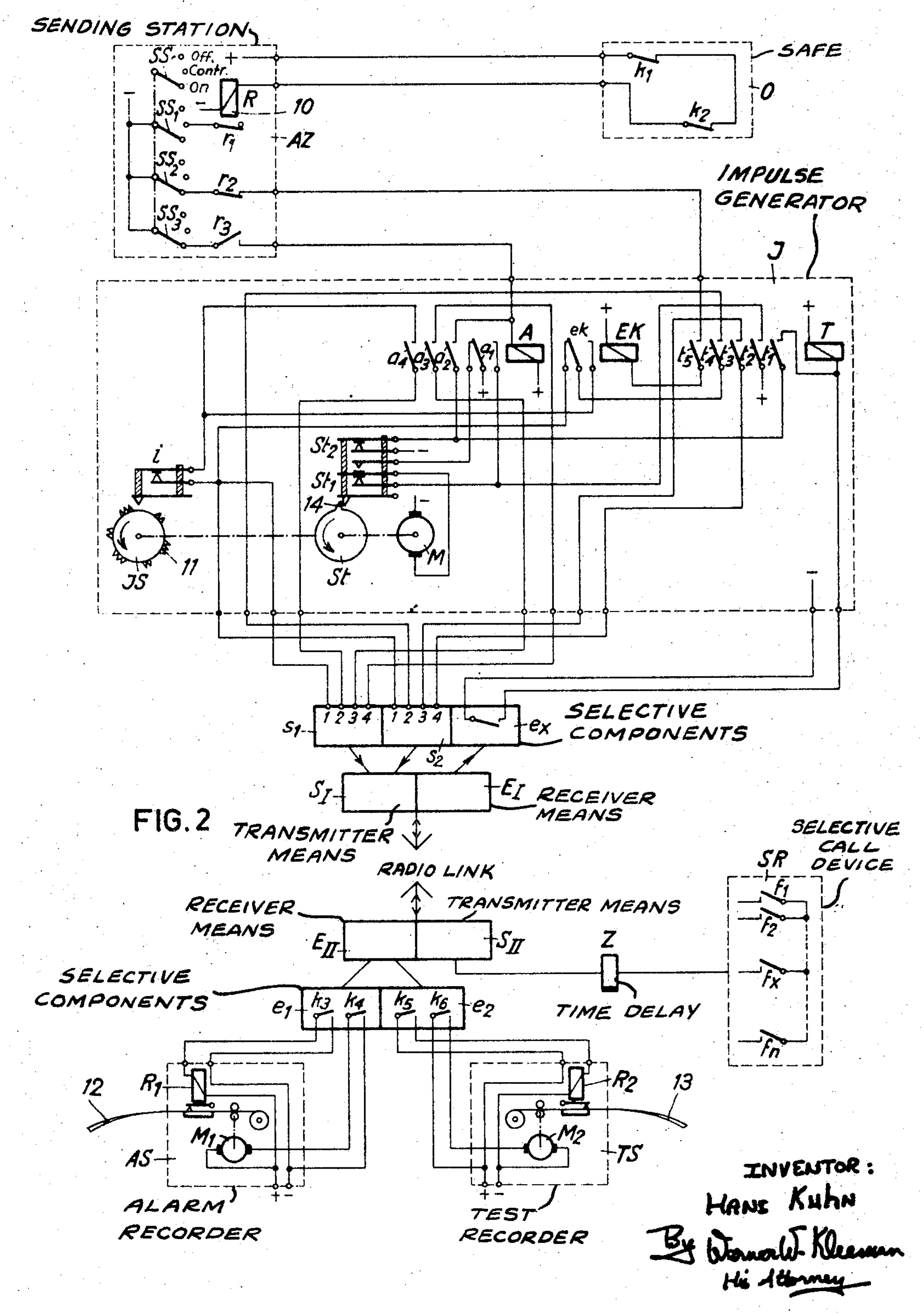

Other features, objects and advantages of the invention will become apparent by reference to the following detailed description and drawings in which:

FIGURE 1 is a block diagram of a preferred embodiment of inventive alarm transmission installation; and FIGURE 2 is a circuit diagram of the embodiment of alarm transmission installation depicted in FIGURE 1.

Describing now the drawings and initially turning attention to FIGURE 1 it will be understood that in the event an attempt is made to break into for instance a safe O an alarm signal is triggered at an alarm control or sending station AZ situated at a place which is protectively supervised. Due to giving the alarm an impulse generator J is placed into operation which calls the central command station via a selective transmitter component or portion $s_1$ and the transmitter means $S_I$. Due to such call an alarm recorder AS is placed into operation at the command station via a receiver $E_{II}$ and a selective receiver component $e_1$. This alarm recorder AS plots the series of impulses (corresponding to the number or identification mark of the relevant subscriber) which are controlled by the impulse generator J.

In order to carry out the previously mentioned test- and switch-in checking operation an official at the central command station closes a predetermined switch or contact at a selective call device SR which is correlated to the establishment of a given client or subscriber which is to be checked, a bank for instance. Hence, a selective signal of frequency $fx$ is transmitted through the agency of a transmitter $S_{II}$ and a timing relay Z which determines the length of the test impulse or signal to be sent. This selective test signal $fx$ is received by a receiver means $E_I$ located at the situs of the relevant subscriber or client. A selective receiver component $e_x$ only responds to a frequency coordinated with it. Consequently, the impulse generator J of the subscriber which is to be checked is placed into operation. At the same time, the transmitter $S_I$ is switched in via a selective transmitter component or portion $s_2$. If the alarm control station AZ is in a state of readiness, i.e. correctly switched in, then the transmitter $S_I$ transmits a "yes" signal. On the other hand, if the alarm control station AZ is not properly switched in, then the transmitter $S_I$ transmits a "no" signal. If the transmitter apparatuses are malfunctioning then the receiving station (central command station) does not receive any answer. The test signal is received at the central command station by a receiver $E_{II}$ and is recorded as documentary evidence upon a tape recording device TB or otherwise through the agency of a selective receiver component $e_2$.

For the sake of simplicity, FIGURE 2 shows a protected object e.g. safe O, which only possesses two rest contacts $k_1$, $k_2$. The current circuit of a relay R of the alarm sending station AZ is: minus terminal or pole, winding 10 of the relay R, both switches or contacts $k_1$, $k_2$ and the plus pole or terminal. So that the relay R will respond or be energized, via a non-illustrated current circuit, the main or master switch SS must be brought into the "on" position. Contact $r_2$ is closed while $r_3$ opens.

The impulse generator J incorporates a relay A (alarm), a relay EK (switch-in checking or control) and a relay T (test). A motor M drives a control disc S*t* and an impulse disc JS. Control takes place such that signalling of the alarm corresponds to a complete revolution of the impulse disc JS. The latter is composed of a toothed wheel at which teeth can be broken away. The series of teeth 11 which have not been broken away produce interruptions at an impulse contact or switch *i* during running of the impulse disc JS.

If the current circuit of the protected object O is interrupted, for instance by opening a contact $k_1$ or $k_2$, then the alarm relay R is de-energized. The contact $r_3$ closes and energizes the relay A. Should triggering of the alarm signal take place only for a short period of time, then nonetheless the entire alarm-giving operation is ensured in that the relay A is brought into self-holding condition via a contact $a_2$. Upon energization of the relay A, the transmitter component $s_1$ for the alarm signal is placed into operation via the contact $a_3$ and the terminals 3, 4.

At the same time, a potential is applied to the motor M of the impulse generator J through the agency of the contact $a_1$. This motor M is maintained in operation until the control disc S*t* has carried out one complete revolution. After such revolution the control contacts $St_1$ and $St_2$ are opened. The relay A is de-energized and the motor M stops.

The impulse contact *i* is coupled via the contact $a_4$ with the terminals 1, 2 of the transmitter component $s_1$. The impulse contact *i* is sequentially interrupted and the number of such interruptions is dependent upon the number of teeth 11 at the impulse disc JS. The alarm signal is amplified by the continuously switched-in receiver $E_{II}$ located at the central command station, received by the receiver component $e_1$, and the contact $k_4$ for starting the alarm recorder AS is closed. The motor $M_1$ transports the paper strip 12 through the agency of suitable means known to the art. The contact $k_3$ is likewise closed by the received alarm signal, so that the relay $R_1$ of the alarm recorder AS responds. In rhythm with the interruptions of the impulse contact *i* of the impulse generator J, the relay $R_1$ is without current due to the absence of a signal. In this manner, the impulses are recorded upon the paper strip or tape 12.

After a complete revolution of the control disc S*t* of the impulse generator J a signal is no longer transmitted. Consequently, the receiver $E_{II}$ no longer receives any signal and the contacts $k_3$ and $k_4$ are opened and stop the alarm recorder AS. By virtue of the transmitted signals the central command station can immediately determine which subscriber has sent an alarm signal.

As previously mentioned, it is of paramount importance with security- and alarm-transmitting installations, particularly for breaking and entering and robbery alarm installations, to check, for instance each evening, whether the person responsive for setting the alarm system has, in fact, properly switched such in, and whether the alarm installation is in a state of readiness. In order to render such possible, auxiliary contacts are provided for the alarm control station AZ, all switching means as well as those components which experience a change during switching-in, switching-out, and in the state of alarm. These auxiliary contacts when electrically interconnected form a so-called switch-in current circuit. This switch-in current circuit is only then opened or closed (depending upon the circuit arrangement) if all manipulations have been properly fulfilled at the alarm control station AZ, as well as at the components belonging to the installation, such as code switches, doorlocks, etc. With the aid of this switch-in current circuit, the impulse generator J, the selective call device SR and the test recorder TS, it is possible to carry out a remote checking of the switched-in condition of the alarm transmission installation, wherein the same means can at least be partially employed which are necessary for transmitting an alarm signal.

If, for instance, the alarm transmission installation of a bank is to be checked in the evening by the central command station (police station) with regard to its readiness, then the following procedure is undertaken: At the selective call device SR there is actuated the contact which is associated with the client or subscriber to be checked. As a result, a selective call signal, assumed to be call signal *fx* is generated and transmitted for a certain period of time by the timing relay Z and test transmitter $S_{II}$. Although this selective call signal is received by the receivers of different clients, it is only, however, evaluated by the corresponding alarm transmission installation since only this one responds to the mentioned selective call signal *fx*. Due to this response, a current circuit is closed which energizes the test relay T of the impulse generator J. Due to energization of relay T, the motor M has voltage applied thereto via the contact $t_2$ and the control contact $St_1$. The relay T remains energized via the contacts $t_1$ and $St_2$. The transmitter $S_I$ is also placed into operation through the agency of the closed contact $t_3$ of the relay T and the transmitter component $s_2$. The switch-in control relay EK is coupled via the closed contact $t_5$ with the output of the switch-in current circuit of the alarm sending station AZ and responds if the latter is in a state of readiness, in other words, if all switching operations have been properly carried out. The impulse contact *i* is coupled with the terminals 1, 2 of the transmitter component $s_2$ through the agency of the closed contact $t_4$ and the contact *ek* of the relay EK.

If the alarm transmission installation has been properly switched in, then the same series of impulses is transmitted via the impulse contact *i* as during giving of an alarm, however, in this case via the transmitter portion $s_2$. If the alarm transmission installation is not properly operated, or if it is not in a state of readiness, then the relay EK does not respond and in place of the corresponding subscriber number a continuous signal is transmitted.

If there is a transmitter defect then no signal whatsoever is transmitted, so that the following three possibilties exist:

Alarm transmission installation is in a state of readiness,
Alarm transmission installation is not in a state of readiness, and
Installation is defective.

The receiver means $E_{II}$, $e_2$ of the central command station responds to the test signal transmitted by the test transmitter means $s_2$, $S_I$. The contact $k_6$ is closed. The motor $M_2$ of the test recorder TS is placed in operation and displaces the paper strip or tape 13. At the same time, the contact $k_5$ is closed. The relay $R_2$ of the test recorder TS responds and places the latter in a state of readiness. The relay $R_2$ is actuated in rhythm with the impulses and interruptions produced by the impulse disc JS and contact *i* and this relay $R_2$ records in conventional manner the identifying number, or code mark of the subscriber or client insofar as the entire installation is in a state of readiness. If the installation is not in a state of readiness, then the relay $R_2$ responds without interruption due to the continuous impulse, so that a line is recorded upon the tape 13. A transmitter defect also corresponds to the plotting of a line.

After the control disc $St$ has carried out one revolution, the contacts $St_1$ and $St_2$ open since they are actuated by the cam 14 of the control disc $St$, and the relays T and EK are de-energized, assuming that the installation has been properly switched in. The motor M stops and it is ready for carrying out a further checking operation or reporting an alarm.

The inventive alarm transmission installation possesses the following advantages: an individual switch-in control or checking operation of all components of the installation installed at the respective establishments of the subscribers.

An individual checking or detecting possibility at the central command station of the following conditions: alarm, installation in state of readiness, installation not in state of readiness, installation defective. Receiving of the alarm, even during testing, is ensured since the transmitters for the alarm signal and test signal do not operate under the same conditions and the received signals work with separate receiver means (recorders). When an alarm is given there is undertaken an extremely rapid reporting of such alarm and identification of the reported object in a maximum of 15 seconds, since one revolution of the control disc is fixed at a maximum of 15 seconds. The subscriber numbers, i.e. identification markings, which identify a particular client, can be easily exchanged since the impulse discs TS possess for instance breakaway teeth 11. Furthermore, such discs can be easily exchanged.

While there is shown and described a present preferred embodiment of the invention it is to be distinctly understood that the invention is not limited thereto but may be otherwise variously embodied and practiced.

What is claimed is:

1. An alarm transmission installation for transmitting an alarm from subscriber stations to a central location; each subscriber station comprising an impulse generator for producing an alarm signal and a selective transmitter for the wireless transmission of said alarm signal; said central location comprising a selective receiver for receiving said alarm signal, and recording means for recording said received alarm signal; checking means for checking the operational preparedness of said subscriber stations, said checking means comprising a selective call means and a transmitter means disposed at said central location to transmit a selective call to said subscriber stations for controlling the switching-in of a selected subscriber station, each subscriber station being further provided with a selective receiver responsive to a transmitted selective call to place said impulse generator into operation, said selective transmitter of said subscriber stations operating in response to said impulse generator whereby test signals are transmitted as a function of the switching-in condition of the subscriber station, said selective receiver at said central location receiving said test signals, and a test recorder at said central location for recording said test signals.

2. Alarm transmission installation according to claim 1 wherein said checking means further includes auxiliary contacts which when electrically interconnected form a switch-in current circuit enabling the checking operation to be carried out.

3. Alarm transmission installation according to claim 1 wherein said impulse generator means includes a motor, an impulse disc driven by said motor, and an impulse switch selectively operated by said impulse disc.

4. Alarm transmission installation according to claim 3 wherein said impulse generator means further includes an alarm relay provided with a plurality of contacts in circuit with said motor and the associated alarm control station, said alarm relay placing said motor into operation when said alarm control station transmits an alarm signal.

5. Alarm transmission installation according to claim 4 wherein said impulses generator means further includes a test relay in circuit with said selective receiver means, said test relay incorporating a plurality of contacts capable of coupling the associated alarm control station with said selective transmitter means and for starting said motor.

6. Alarm transmission installation according to claim 5 further including a switch-in control relay in circuit with a given contact of said test relay and said impulse switch.

7. An alarm transmission installation for transmitting an alarm from given subscriber locations undergoing protective supervision to a central command station and for checking the given subscriber stations, said alarm transmission installation comprising: a plurality of subscriber stations, each subscriber station comprising an impulse generating means for producing predetermined impulse signals in response to an alarm condition and in response to a received selective interrogation signal, a transmitter means coupled to said impulse generator means operative to selectively transmit said impulse signals as an alarm signal or as a selective test signal, said transmitter means transmitting said impulse signals as a selective test signal in response to a received selective interrogation signal, and selective receiver means for receiving a selective interrogation signal; a central command station, said central command station comprising a receiver means responsive to alarm signals transmitted from said plurality of subscriber stations to produce an alarm output and responsive to selective test signals transmitted from said plurality of subscriber stations to produce a test output, said receiver means being operative to receive a predetermined selective test signal in accordance with a given interrogation signal, recorder means coupled to both said alarm and test outputs, a selective interrogation signal generator means, and a transmitter means coupled to said selective interrogation signal generator means for transmitting said interrogation signal.

References Cited

UNITED STATES PATENTS

| | | | |
|---|---|---|---|
| 2,980,898 | 4/1961 | Mason | 340—408 |
| 3,256,517 | 6/1966 | Saltzberg | 340—408 |

THOMAS B. HABECKER, *Primary Examiner.*

U.S. Cl. X.R.

340—220, 224